United States Patent [19]

Rosser et al.

[11] 4,273,918

[45] Jun. 16, 1981

[54] PREPARATION OF CROSSLINKED 1,2,4-OXADIAZOLE POLYMER

[75] Inventors: Robert W. Rosser; Ibrahim M. Shalhoub, both of San Jose; Hanoi Kwong, Sacramento, all of Calif.

[73] Assignee: The United States of America as represented by the United States National Aeronautics and Space Administration, Washington, D.C.

[21] Appl. No.: 145,284

[22] Filed: Apr. 30, 1980

Related U.S. Application Data

[62] Division of Ser. No. 28,301, Apr. 9, 1979.

[51] Int. Cl.$^3$ ............................................. C08G 73/08
[52] U.S. Cl. .................................. 528/310; 528/328; 528/362; 528/401; 528/422
[58] Field of Search ............... 528/310, 362, 401, 422, 528/328

[56] References Cited

PUBLICATIONS

Encyclopedia of Polymer Science and Technology, vol. 11 (1969), pp. 184–187.

*Primary Examiner*—Harold D. Anderson
*Attorney, Agent, or Firm*—Darrell G. Brekke; John R. Manning

[57] ABSTRACT

New crosslinked 1,2,4-oxadiazole elastomers have been prepared by thermally condensing (a) monomer having the formula $H_2N(HON)C-R-Q$, wherein Q is a triazine ring-forming group such as nitrile or amidine or a mixture of such group with amidoxime, or (b) a mixture of said monomer with $R[C(NOH)NH_2]_2$, with R in these formulas standing for a bivalent organic radical having the formula $$-(CX_2)_p-, \text{ or}$$
$$-CFY(OCF_2CFY)_mO(CX_2)_pO(CFYCF_2O)_n-CFY-$$

wherein X is fluorine or hydrogen, Y is fluorine or trifluoromethyl, p ranges from 1 to 18, and m+n ranges from 2 to 7. In the monomer charge, the overall proportions of amidoxime groups to triazine ring-forming groups varies depending on the extent of crosslinking desired in the final polymer.

5 Claims, No Drawings

PREPARATION OF CROSSLINKED 1,2,4-OXADIAZOLE POLYMER

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

This is a division, of application Ser. No. 028,301 filed April 9, 1979.

BACKGROUND OF THE INVENTION

1. Field of the Invention

The present invention relates to polymers that are derived from diamioxime monomers and contain 1,2,4-oxadiazole rings which serve as linking groups in the polymer chain. More particularly, the invention relates to such polymers crosslinked by triazine rings.

2. Description of the Prior Art

Viscous polymers have been prepared by the condensation of diamidoxime monomers to form linear molecules in which the 1,2,4-oxadiazole ring acts as linkages. The chain segments between said linkages can be alkylene radicals, arylene radicals, perfluorinated alkylether radicals, or perfluorinated alkylether radicals. The perfluorinated linear poly(1,2,4-oxadiazoles) have been described in copending patent application Ser. No. 843,090, now U.S. Pat. No. 4,145,524, while various methods of synthesizing polymers of this type have been discussed in Polyhydrazides and Polyoxadiazoles, Kirk-Othmer's Encyclopedia of Chemical Technology, Volume II, pages 184-7 (1966).

SUMMARY OF THE INVENTION

An object of this invention is to prepare poly(1,2,4-oxadiazoles) crosslinked by triazine rings. Another object is to prepare new monomers with which to carry out said polymerizations. Still another object is to provide tough, heat and chemical resistant elastomeric polymers.

These and other objects of the present invention which shall hereinafter become apparent, can be attained by the thermal reaction of certain monomers or mixtures of monomers containing various proportions of amidoxime, nitrile, and amidine groups. The resulting polymers are basically constituted by structures of the following type:

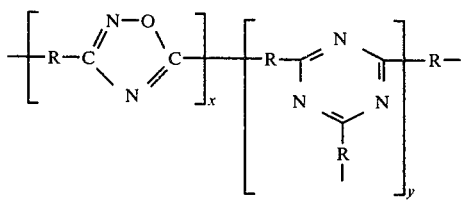

in which the number (x and y) and the order of the oxadiazole and triazine linkages are randomly determined and are functions of the nature and the proportions of monomers present in the reaction mixture. The usable monomers can be represented by the formula $H_2N(HON)-R-Q$ in which: (1) R is a bivalent organic radical, or a mixture of bivalent organic radicals, having the formula $-(CX_2)_p-$, or
$-CFY(OCF_2CFY)_mO(CX_2)_pO(CFYCF_2O)_n-CFY-$, in which X is fluorine or hydrogen, Y is fluorine or trifluoromethyl, p ranges from 1 to about 18, and m+n ranges from 2 to about 7; and (2) Q is an amidoxime, nitrile, or amidine group.

The triazine-crosslinked oxadiazole polymers of the invention can be obtained by heating together at temperatures within the range of 50° C. to 210° C., any suitable mixture of said monomers or any of said monomers containing the overall concentration of triazine-forming groups sufficient to achieve the particular degree of crosslinking and curing desired.

DETAILED DESCRIPTION OF THE INVENTION

The polymers of the invention are prepared by the heat induced condensation reaction of amidoxime groups to form 1,2,4-oxadiazole linkages and of nitrile or amidine groups to form triazine linkages. The following reactions illustrate the various processes involved in the invention:

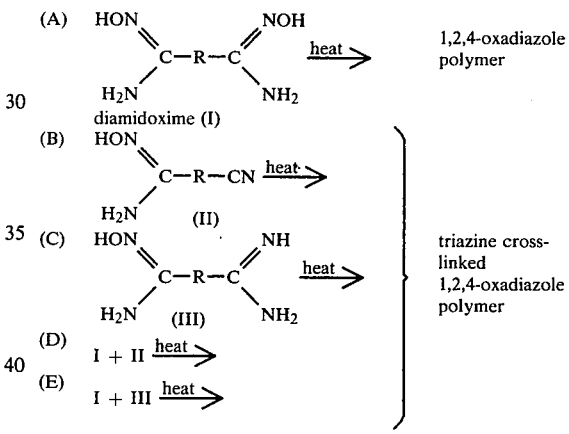

The first reaction (A) has already been described in copending application Ser. No. 843,090, filed on Oct. 17, 1977 and now U.S. Pat. No. 4,145,524. The other four reactions (B to E) show the various monomers and combination of monomers that will yield the crosslinked elastomers herein disclosed. In these formulas, R represents identical bivalent organic radicals or any combination of bivalent organic radicals selected from the group consisting of: $-(CX_2)_p-$, wherein p ranges from 2 to about 18 and X is hydrogen or fluorine; and oligomeric or polymeric radicals prepared by reaction of a dicarboxylic acid halide with a perfluoroepoxide and having the formula $-CFY(OCF_2CFY)_mO(CX_2)_pO(CFYCF_2O)_n-CFY-$ (IV)

wherein Y is fluorine or trifluoromethyl, X is fluorine or hydrogen, p ranges from 1 to about 18 and m+n ranges from 2 to about 7.

The polymers formed from these monomers will vary in structure according to the type and proportion of monomer end groups present. Thus, when an amidoxime-amidine (III) monomer is used, the resulting polymer has a theoretically equal number of oxadiazole rings and crosslinking triazine rings. Using any or a combination of the two monomers (II and III) with a diamidoxime (I) will, of course, increase the proportion of oxadiazole linkages formed and decrease the proportion of crosslinking triazine rings. Whatever proportions of monomer reactive end groups are actually selected for the preparation of a given crosslinked polymer will depend ultimately on the properties that said polymer must have. In this respect, the preferred ratio of oxadiazole ring-forming groups to triazine ring-forming groups for obtaining the most adequate level of elasticity in the polymer, when elasticity is desired, should be about 9 or 10:1. Higher contents of triazine linkages will increase the rigidity of the polymer and render them useful for other applications.

The condensation reactions undergone by the monomers to form the linear oxadiazole linkages and the tridimensional triazine linkages are carried out by heating the monomer charge at temperatures of up to about 200° C. for a period sufficient to obtain the degree of cure desired. The following table provides an idea of what may be expected from various heating regimes for a particular monomer charge:

| Temperature | Time | $\overline{MW}$ |
|---|---|---|
| 80°–130° C. | 3 days | ~3,000 (3000–10,000) |
| 150° C. | 1 to 1.75 days | 10,000 to 35,000 |
| 150° C. | 3.5 days | ~35,000+ |

Although heating at 150° C. has produced polymers of weight average molecular weights of 35,000, as measured by viscosimetry, an elastomeric network ordinarily begins to form during the 150° heating cycle and is completed during the 200° C. post-cure heating period.

The heat and chemical resistant polymeric materials of this invention can be compounded with a great variety of fillers, extenders, and modifiers for use in numerous applications in which high stability, impermeability to liquids and gases, good plasticity and elasticity, or rigidity are advantageous. Keeping in mind that some of these desirable properties can be altered in any direction by selection of the monomer mix and polymerization conditions, the resulting polymers may be employed, for example, as adhesives, caulking compounds, channel sealants, fuel tank liners, and the like.

The invention having thus been generally described, a few specific embodiments will now be provided to illustrate the processes and products involved. These examples are not intended to be limiting of the invention scope.

The diamidoximes (I) that can be used in the preparation of the polymers of the present invention can be synthesized by methods described in detail in U.S. Pat. No. 4,455,244, methods which involve, for example, the successive conversion of the corresponding diacylfluoride to the diamide, the dinitrile, and finally the diamidoxime. The preparation of the other monomers used, i.e., the amidoxime-nitrile (II) and the amidoxime-amidine, will now be described.

EXAMPLE 1

An amidoxime-nitrile compound (see formula II) in which the value of m+n in the R group (see formula IV) is equal to 6, was prepared by placing hydroxylamine, 0.355 g (10.78 mmoles) in a 100 ml round-bottomed flask and adding the corresponding dinitrile, 9.0154 g (5.89 mmoles, 11.78 molar equivalents), and trichlorotrifluoroethane (Freon 113), 20 ml. The flask was purged with nitrogen gas and the contents stirred overnight. The solution was removed from the flask and the solvent evaporated with nitrogen gas to give 8.07 g of the amidoxime-nitrile, an 85% yield. Infrared analysis of the product showed absorption at 2.86 μm; 2.96 μm (NH$_2$); 2.98 to 3.32 μm (OH); 4.43 μm (C≡N); 5.96 μm (C=N); 6.33 μm (C=N); and 7 to 9 μm (C—F). The ratio of nitrile to amidoxime was 1:10.8.

EXAMPLE 2

In a preparation similar to Example 1, the quantities of materials used were 14.51 g (9.48 mmoles, 18.96 molar equivalents) of the dinitrile, 0.60 g (18.17 mmoles) of hydroxylamine, and 30 ml Freon 113. After stirring for 16 hours, filtering, evaporating, and degassing for 2 hours, 13.52 g (93.1% yield) of the amidoxime-nitrile compound were obtained showing IR absorption bands for NH$_2$, OH, C≡N, C=N, and CF. The nitrile to amidoxime group ratio was 1:23.

EXAMPLE 3

Another method of preparing the amidoxime-nitrile cross-linking reagent involves the use of absolute methanol as a solvent for the hydroxylamine. According to this method, hydroxylamine, 0.7731 g (23.41 mmoles), was dissolved in absolute methanol, 0.08 ml. This was added to a round-bottomed flask containing the dinitrile of Example 1, 20.7759 g (13.58 mmoles, 27.16 molar equivalents), dissolved in Freon 113, 30 ml. The homogenous solution was stirred for 17 hours under a blanket of argon gas. After filtration and evaporation, 19.4878 g (93.8% yield) of the amidoxime-nitrile compound were obtained, having a 1:6.24 ratio of nitrile to amidoxime.

EXAMPLE 4

An amidoxime-amidine compound (III) was prepared by stirring together in a nitrogen atmosphere for 16 hours 11.02 g (7.2 mmoles, 14.4 molar equivalents) of the dinitrile used in Example 1, with 0.28 g (8.48 mmoles) hydroxylamine diluted with 30 ml Freon 113. Ammonia was then bubbled into the solution for 1 hour at room temperature. This gave 10.55 g (93.5% yield) of crosslinking agent having a 1:1.43 ratio of amidine to amidoxime groups. IR absorption was measured at 2.84 to 3.02 μm (NH$_2$); 2.97 to 3.32 μm (OH); 5.77, 5.95, and 6.33 μm (C=N amidoxime); 6.06, 6.25 μm (C=N amidine); and 7 to 9 μm (CF).

EXAMPLE 5

In a preparation similar to that of Example 4, an amidoxime-amidine crosslinking agent was obtained by stirring together in a nitrogen atmosphere for 16 hours, 15.4413 g (10.09 mmoles, 20.18 molar equivalents) of the dinitrile of Example 1, with 0.5713 g (17.30 mmoles) hydroxylamine diluted with 35 ml Freon 113. Ammonia was then bubbled through the solution for 1 hour at room temperature. This gave 14.5303 g (94.1% yield) of the crosslinking agent, having a 1:6.0 amidine to amidoxime group ratio.

EXAMPLE 6

Various polymers were prepared from nitrile-amidoxime (II) and amidine-amidoxime (III) monomers prepared as in Examples 1 and 2, containing various ratios of nitrile or amidine groups to amidoxime groups. Polymerization and crosslinking were accomplished simply by heating a monomer with a given triazine ring-forming group to amidoxime ratio in the following manner: 80°–130° C. for 2 days at 50 cm Hg; 150° C. for 3 to 4 days in full vacuum; and 200° C. for 2 to 3 days in full vacuum. During this heating schedule, elastomers were formed at 150° C. after 3 days when the proper ratio of groups was present, and the molecular weight was increased by the further heating at 200° C. A selection of monomers identified by their nitrile or amidine to amidoxime content ratio is listed in Table 1 along with some of the properties possessed by the polymers obtained by the heat treatment just described. All the polymers showed IR absorption at 6.29 μm (oxadiazole) and 6.45 μm (triazine).

TABLE 1

Crosslinked Oxadiazoles Obtained From Single Monomers

| Single Monomers | Polymer Properties | |
|---|---|---|
| Ratio of ring-forming groups | Modulus (dynes/cm$^2$) | Glass Transition temperature |
| Nitrile to Amidoxime | | |
| 1:0.54 | 3.5 × 10$^6$ | −47° C. |
| 1:2.33 | 2.0 × 10$^6$ | −46° C. |
| 1:4.5 | 4.3 × 10$^5$ | −47° C. |
| 1:6.3 | 2.5 × 10$^5$ | −47° C. |
| trace nitrile | viscous | — |
| no nitrile | viscous | — |
| Amidine to Amidoxime | | |
| 1:1.0 | 2.6 × 10$^6$ | −46° C. |
| 1:3.0 | 1.5 × 10$^6$ | −48° C. |
| 1:4.1 | 1.0 × 10$^6$ | −47° C. |
| 1:6.3 | 3.0 × 10$^5$ | −47° C. |
| 1:10.7 | elastic | — |
| trace amidine | viscous | — |

Most of the polymers in the above table had a JP-4 jet fuel extractible content of about 1%, on a weight basis. Those with the 1:6.3 ratios, i.e., the most useful from the elastomeric point of view, had extractibles of about 1.5%.

EXAMPLE 7

Crosslinked polymers were prepared by heat treating various mixtures of nitrile or amidine (II and III) hybrid monomers, as used in the earlier examples, with the corresponding diamidoxime compound (I) of said hybrid monomers. The concentration of hybrid monomer in each mixture was adjusted to provide the ratio of triazine-forming groups to oxadiazole-forming groups desired and the resulting mixture was subjected to the following heat regime:

| Temperature | Time | Barometric Condition |
|---|---|---|
| 80°–130° C. | 2 days | ~50 cm Hg |
| 150° C. | 6 days | ~50 cm Hg |
| 200° C. | 2 to 3 days | full vacuum |

During this curing schedule, elastomers were formed at 150° C. after about 5 days and further heating at 200° C. served to increase the crosslinking. The nature and proportions of monomers used, as well as some of the properties of the crosslinked polymers produced, are recorded in Table 2.

EXAMPLE 8

In these preparations using the same monomers as in Example 7, the triazine ring-forming material and the diamidoxime were heated separately under reduced pressure before blending. The heat regime applied is shown below, with steps a to d being conducted in sequence:

| | Temperature | Time | Barometric Condition |
|---|---|---|---|
| | Individual monomers: | | |
| (a) | 80°–130° C. | 2 days | ~50 cm Hg |
| | Blend of pre-heated monomers: | | |
| (b) | 80–130° C. | 1 day | ~50 cm Hg |
| (c) | 150° C. | 4 days | ~50 cm Hg |
| (d) | 200° C. | 2 days | full vacuum |

It has been found that the blending methods just described which involve direct mixing or pre-treating the monomers with heat separately before they are blended, significantly improves the reproducibility of the polymer properties when relatively large quantities of monomers are mixed and then heated as in Examples 7 and 8.

The results of several amidine-amidoxime blends treated in the manner just described are reported in Table 2, along with the data from Example 7.

TABLE 2

Crosslinked Oxadiazoles Obtained From Monomer Mixtures Containing a Diamidoxime

| Monomer Mixture | | | | | Extractibles (24 hrs) | | TGA Analysis |
|---|---|---|---|---|---|---|---|
| Crosslinking Agent Ratio* | Diamidoxime Weight (g) | Final Ratio* | Monomer Preheating | Modulus** (dynes/cm$^2$) | Boiling Water | Boiling JP4 Fuel | 275° C. in air for 24 hours |
| | Weight (g) | | | | | | |
| EXAMPLE 4: | | | | | | | |
| 1:2.1 | 0.5242 | 0.5600 | 1:5.53 | no | 2.4 × 10$^6$ | 1.0% | 1.0% | 2.0% |
| 1:2.1 | 2.0314 | 1.9835 | 1:5.13 | no | 3.5 × 10$^6$ | — | — | — |
| 1:4.1 | 0.4340 | 0.1637 | 1:6.02 | no | 1.0 × 10$^5$ | 1.0% | 0.5% | 2.1% |
| 1:4.1 | 0.5925 | 0.1981 | 1:5.8 | no | 3.0 × 10$^5$ | 1.0% | 0.5% | — |
| 1:4.1 | 0.6670 | 0.2599 | 1:6.1 | no | 2.0 × 10$^5$ | 0.5% | 0.7% | 2.2% |
| EXAMPLE 5: | | | | | | | |
| 1:4.1 | 0.227 | 0.082 | 1:5.93 | yes | 2.0 × 10$^5$ | 1.45% | 3.3% | 4.2% |
| 1:4.1 | 0.261 | 0.137 | 1:6.8 | yes | 1.0 × 10$^5$ | 2.0% | 1.34% | 3.2% |
| 1:4.1 | 2.692 | 2.512 | 1:8.86 | yes | — | 1.2% | high | — |
| 1:4.1 | 0.661 | 0.282 | 1:6.7 | yes | 1.0 × 10$^5$ | 0.5% | 2.0% | — |

*Ratio of nitrile to amidoxime (first run) and of amidine to amidoxime (last 9 runs).
**Modulus values were determined by DuPont thermomechanical analyzer.

It is evident from the results in the above table that heat resistant polymers can be prepared with a broad range of properties, depending on the nature and proportions of monomers used. It has further been found that the use of a diamidoxime (I) along with a hybrid monomer (II and III) is quite desirable in achieving reproducible polymer results, especially when such properties as elasticity are desired in optimum degree, e.g., at an overall triazine ring-forming group to amidoxime group ratio of about 1:6.

In any event, the presently disclosed and newly discovered possibility of crosslinking to any desired degree the conventional heat and chemical resistant 1,2,4-oxadiazole perfluorinated polymers of the art, greatly increases their utility in various applications which include those already mentioned as well as others for which they may become suited through the modifications and variations of material and process that the man skilled in the art will surely accomplish without departing from the scope of the appended claims.

What is claimed is:

1. A process for the preparation of a crosslinked 1,2,4-oxadiazole polymer, which comprises heating under reduced pressure at temperatures within the range of about 50° C. to about 210° C., a compound of the formula $H_2N(HON)-R-Q$, wherein: R is a bivalent organic radical selected from the class consisting of alkylene radicals of the formula $-(CX_2)_p-$ and alkylether radicals of the formula

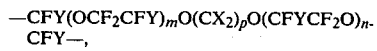

or a mixture thereof, wherein X is fluorine or hydrogen, Y is fluorine or trifluoromethyl, p ranges from 1 to about 18, and m+n ranges from 2 to about 7; and Q is a ring-forming group selected from the class consisting of nitrile, amidine, a mixture of nitrile and amidoxime, and a mixture of amidine and amidoxime.

2. The process of claim 1 wherein the compound $H_2N(HON)-R-Q$ is mixed with a diamidoxime of the formula $H_2N(HON)-R-(NOH)NH_2$ wherein R is defined in claim 1 and wherein the overall proportions of amidine or nitrile to amidoxime groups in the mixture is within the range of 1:1 to 1: about 10.

3. The process of claim 2 wherein the heating is carried out under about 50 cm Hg pressure at about 130° C. for about 3 days, then at about 150° C. for about 5 days, followed by about 2 days at about 200° C. in full vacuum.

4. The process of claim 2 wherein (a) each monomer is first heated separately for about 2 days under about 50 cm Hg at about 80°–130° C., (b) the monomers are blended together, (c) the resulting mixture is successively heated at about 130° C. for about 1 day under 50 cm Hg, at about 150° C. for about 4 days under the same pressure, and lastly at about 200° C. for about two days under full vacuum.

5. The process of claim 3 or 4 wherein the overall proportions of nitrile or amidine to amidoxime group is 1: about 6, and R is a perfluoroalkylether radical wherein p equals 5 and m+n are within the range of 4 to 7.

* * * * *